United States Patent [19]
Klaue

[11] 3,903,998
[45] Sept. 9, 1975

[54] DISC BRAKE COALING STRUCTURE

[76] Inventor: Hermann Klaue, 24, Tour D'Ivoire, 1820 Montreaux, Switzerland

[22] Filed: Dec. 27, 1972

[21] Appl. No.: 318,825

Related U.S. Application Data

[63] Continuation-in-part of Ser. No. 161,607, July 12, 1971, abandoned.

[30] Foreign Application Priority Data

| June 1, 1972 | Switzerland | 8097/72 |
| Sept. 18, 1972 | Switzerland | 13610/72 |
| Nov. 10, 1972 | Switzerland | 16384/72 |

[52] U.S. Cl. ............ 188/71.3; 188/18 A; 188/71.6; 188/264 AA; 192/70; 192/113 A
[51] Int. Cl. ................................. F16d 55/04
[58] Field of Search ...... 188/18 A, 71.3, 71.4, 71.6, 188/264 A, 264 AA; 192/70, 85 AB, 113 A; 301/6 CS, 6 S

[56] References Cited
UNITED STATES PATENTS

| 2,883,007 | 4/1959 | Klaue | 188/71.3 |
| 3,184,002 | 5/1965 | Klaue | 192/70 X |
| 3,251,437 | 5/1966 | Moyer et al. | 188/264 AA |
| 3,435,920 | 4/1969 | Klaue | 188/71.6 X |
| 3,597,000 | 8/1971 | Klaue et al. | 301/6 E |

FOREIGN PATENTS OR APPLICATIONS

| 1,950,879 | 4/1971 | Germany | 188/71.4 |
| 1,960,286 | 6/1971 | Germany | 188/71.4 |

*Primary Examiner*—George E. A. Halvosa
*Attorney, Agent, or Firm*—Larson, Taylor and Hinds

[57] ABSTRACT

Improved brake assembly in a wheel of a vehicle wherein a rotating brake housing is provided with an annular member having an annular gap of channel-like cross-section open on its radially exterior side, the opposite inner sides of the gap providing annular braking surfaces. Disc like brake shoes are arranged within the gap and provided with friction lining facing the braking surfaces. The invention relates to an improved dissipation of heat from the brake housing during the brake operation.

11 Claims, 14 Drawing Figures

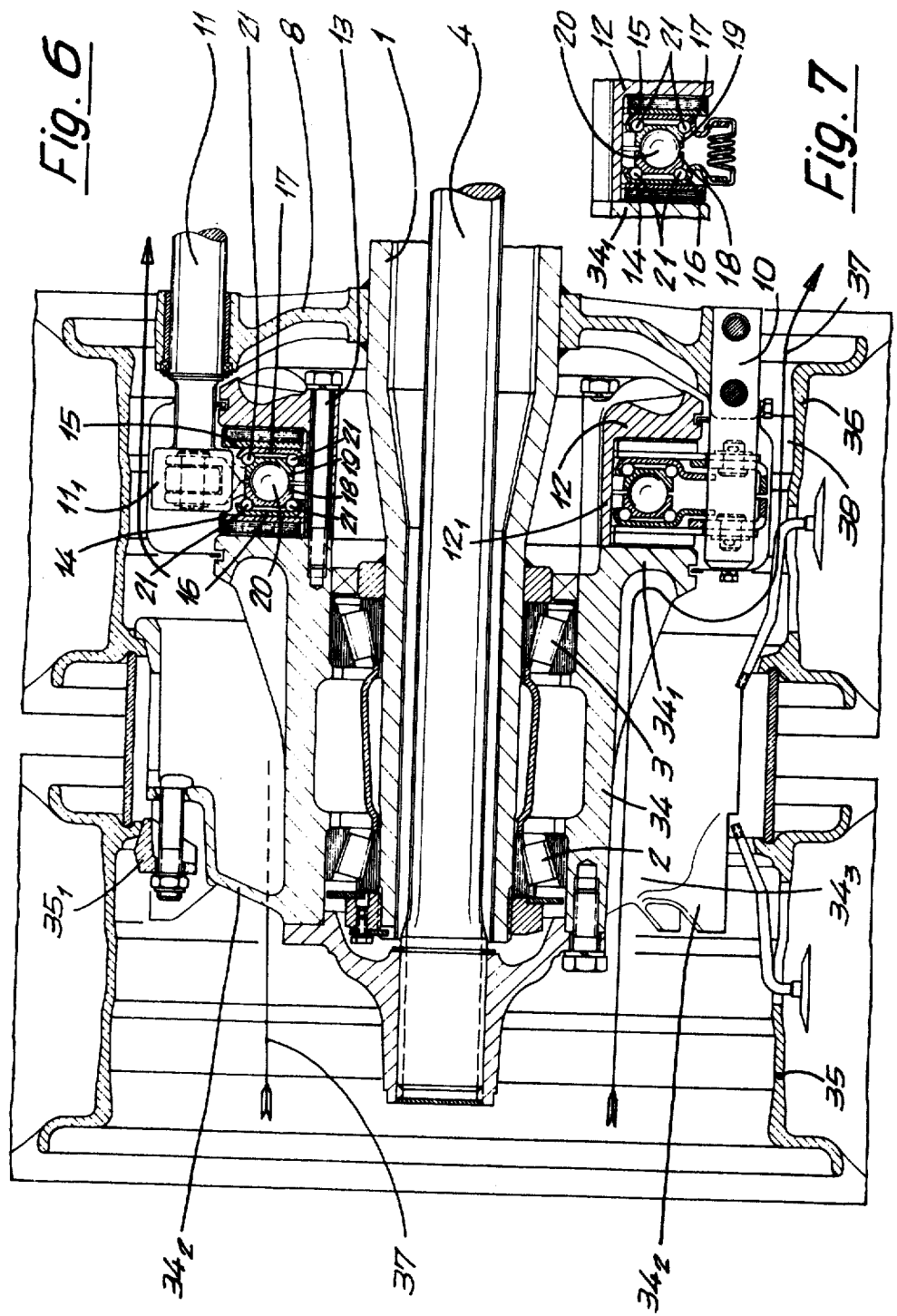

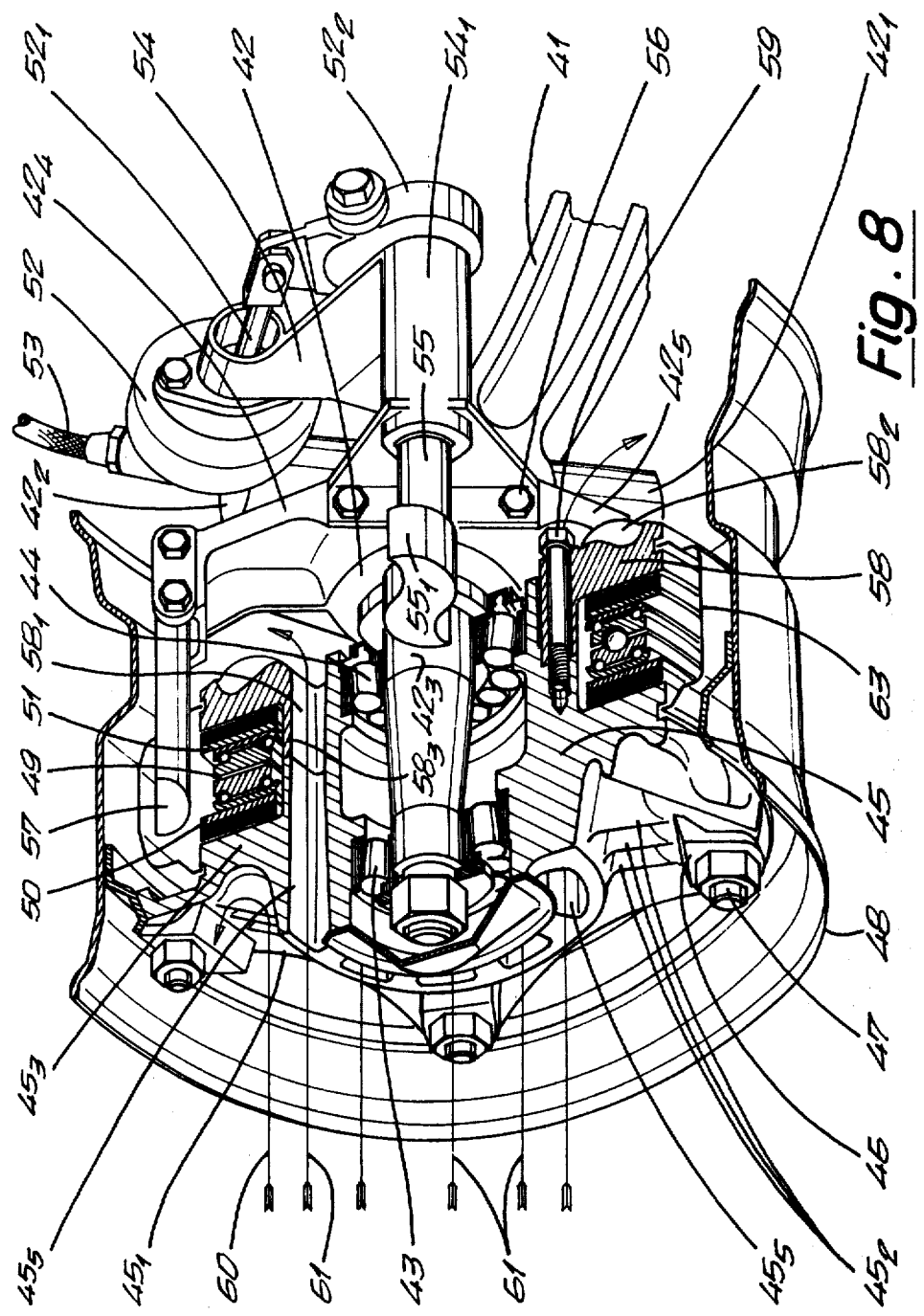

Fig.10 (K-L)

Fig. 13
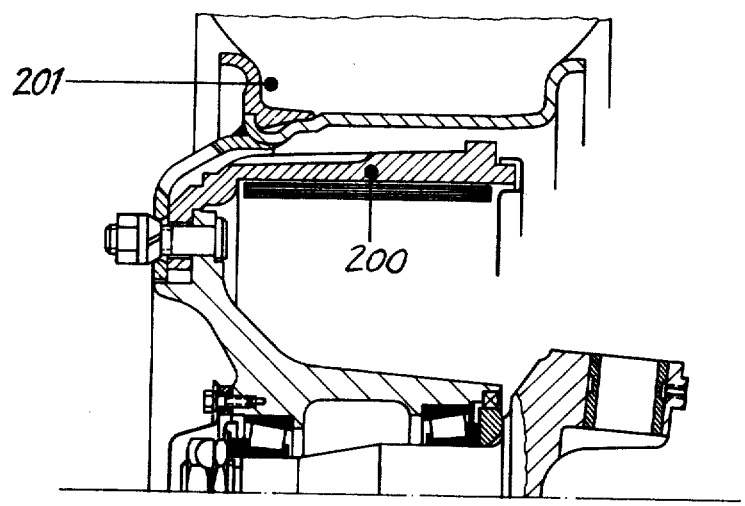
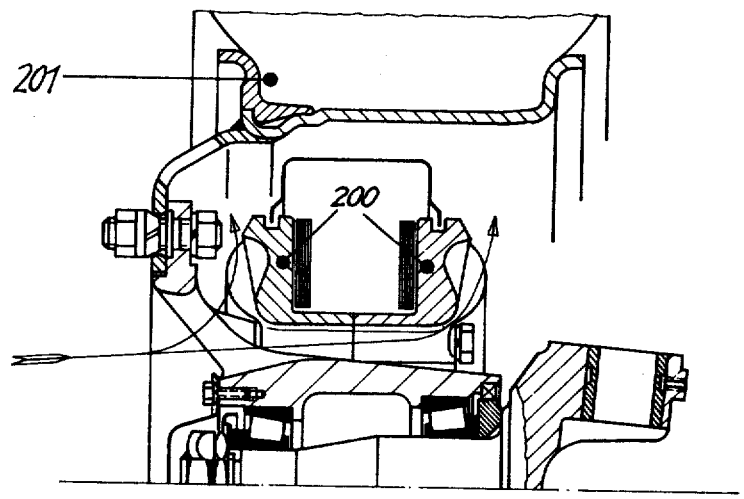
Fig. 14

3,903,998

DISC BRAKE COALING STRUCTURE

RELATED APPLICATION

This is a continuation-in-part of my copending application Ser. No. 161,607, filed July 12, 1971, now abandoned.

BACKGROUND OF INVENTION

This invention relates to a vehicle brake assembly and more particularly to disc brakes comprising a rotating brake housing open on its radially outer circumference.

Brake assemblies of this kind are known in the art. A main problem in connection therewith is the dissipation of the heat developed during brake operation. It is the main object of the present invention to provide an improved heat dissipation from the brake housing. Further objects and advantages of the invention will be set forth in part hereinafter and in part will be obvious herefrom.

The accompanying drawings illustrate typical embodiments of the invention and, together with the description, serve to explain the principles of the invention.

OF THE DRAWINGS

FIG. 6 is a vertical sectional view through the rear dual spoke wheel of a truck;

FIG. 7 is a fragmentary section through the actuating means of FIG. 6;

FIG. 8 is an exploded view of a front spoke wheel of a truck;

FIGS. 13 and 14 are fragmentary views in section of a drum brake and, respectively, a brake according to an embodiment of the invention.

This invention relates to a vehicle brake assembly provided with a brake housing comprising an annular member having an annular gap of channel-like cross-section open on its radially exterior side. The opposite inner sides of said channel like gap provide annular braking surfaces, and said brake housing is rotatable with the wheel. Pairs of segmental brake shoes are disposed from the radially exterior side into the channel-like gap having friction linings facing the adjacent braking surfaces. Each of said pairs of brake shoes abut on a member attached to a stationary part of the assembly. The brake assembly further comprises shoe operating means arranged between the pairs of brake shoes and separate therefrom for causing said shoes to contact the braking surfaces of the brake housing.

The invention has for its main object the provision of a brake assembly having an improved dissipation of heat arising in the braking surfaces of the brake housing. According to my invention, the dissipation of heat is improved by a combination of several features, which are:

First: said brake housing is cast, at least, with a substantial part, to a hub thereby providing an enhanced amount of mass of material to permit improved absorption and storage of heat and to form an enhanced cross-section presented to said heat to improve its carrying off.

Second: by radial ribs formed at the surfaces of said brake housing and channels formed in said hub providing increased surfaces of said parts, which increased surfaces are presented to a cooling air flow supplied from the outside of the wheel during rotation for promoted heat dissipation.

Figure 1:
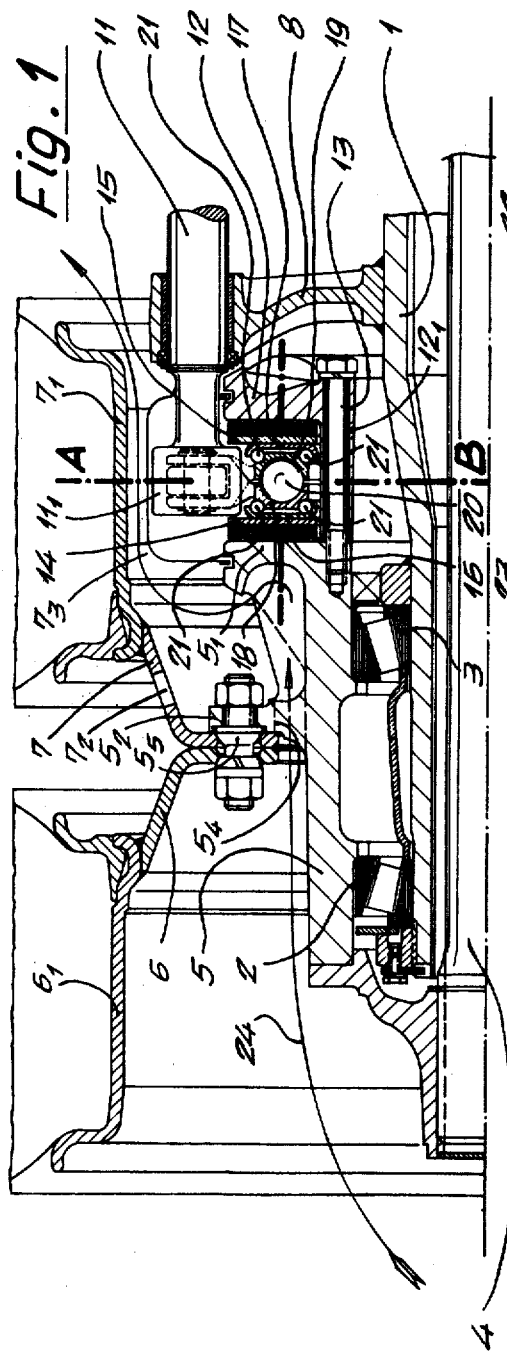
FIG. 1 is the upper half of a vertical sectional view through the rear dual disc wheel of a truck.
Figure 2:
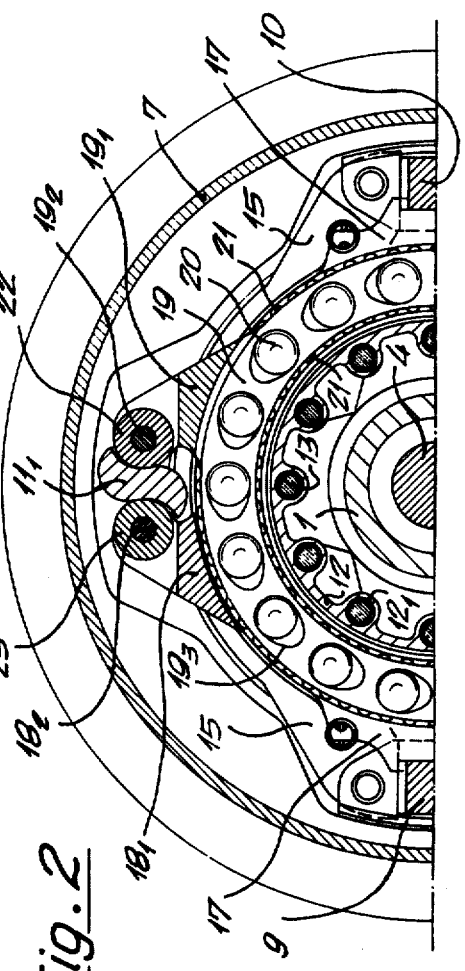
FIG. 2 is a cross-sectional view taken on the line A–B of FIG. 1.
Figure 3:
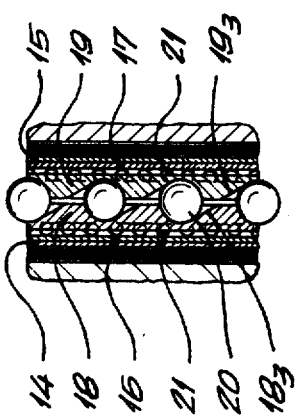
FIG. 3 is a fragmentary cylindrical section taken on the circumference of the actuating rings of FIG. 1.
Figure 4:
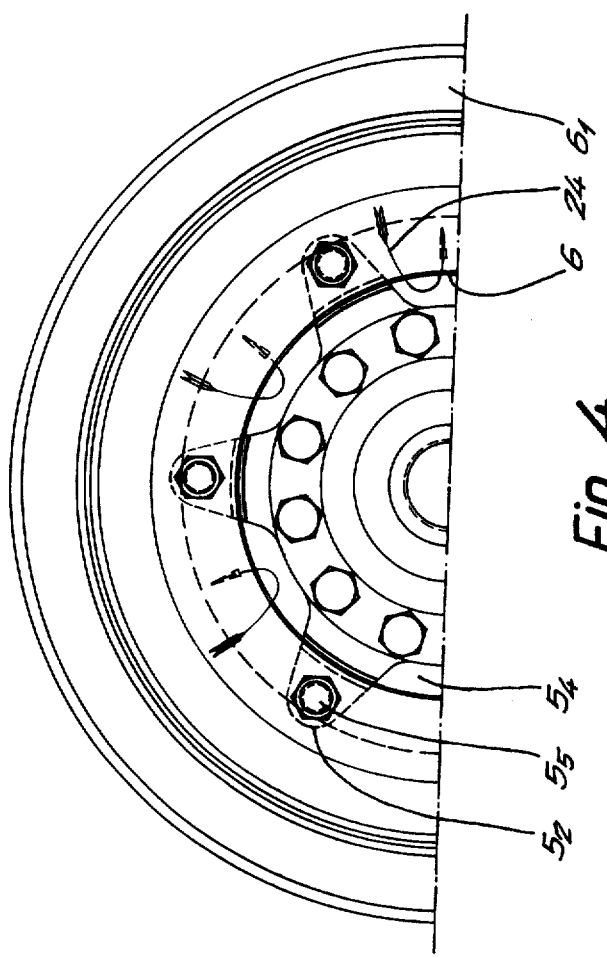
FIG. 4 is a view from the outside of the wheel of FIG. 1 in the axial direction, showing the annular flange.

Referring now in detail to the illustrative embodiment of the invention as shown in the accompanying drawings, the invention is shown in FIGS. 1 to 4 as applied to the dual disc wheels of a heavy truck. The hub 5 is driven by the spindle 4 and journalled by means of the tapered roller bearings 2 and 3 on the rear axle 1. The hub 5 is formed with an annular flange $5_2$ having the form of a spider as shown in FIG. 4. Two tapered sections 6 and 7 adapted to carry the rims $6_1$ and $7_1$ are mounted on the annular flange $5_2$ by means of bolts $5_5$. A carrier 8 mounted on the axle 1 has the form of a three-arm spider. Two of these arms provide abutments for two oppositely disposed brackets 9 and 10 adapted to support the actuating means of the brake; rotatably supported in the third arm of the carrier 8 is the spindle 11 to operate the actuating means.

The brake housing incorporates two annular members $5_1$ and 12 which are bolted together by means of the bolts 13 at their radially inner circumference thereby forming an annular, channel-like gap therebetween open on its radially outer side. The member $5_1$ is formed with the hub 5 which is thus a part thereof. The member 12 being the cover of the brake housing has a rim $12_1$ forming the bottom of the annular gap. Member $5_1$ and cover 12 are each provided at their outer surface with a plurality of radial ribs, while their inner walls provide oppositely disposed rotating braking surfaces. Disposed within the channel-like gap are the brake shoes 14 and 15 provided with linings facing the braking surfaces. Interposed between the brake shoes and separated therefrom are the actuating means comprising a ball and ramp mechanism consisting of two actuating rings 18 and 19 and balls 20 disposed in ramps $18_3$, $19_3$ between these rings 18, 19. The actuating means further comprise ball bearings 21 and thrust rings 16, 17. The thrust rings 16, 17 and the brake shoes 14, 15 each have shoulders adapted to support the actuating means and the brake shoes on the brackets 9, 10 slidable in the axial direction but held against circumferential movement.

The actuating rings 18 and 19 are provided with extensions $18_1$ and $19_1$ respectively. The extensions are bifurcated and have each a pin $18_2$ and $19_2$ supporting a pressure roller 22 and 23 respectively. Disposed between the rollers 22 and 23 is a double cam $11_1$ mounted on the end of the spindle 11. To effect the braking operation the spindle 11 is rotated whereby the actuating rings 18 and 19 are angularly displaced relative to each other.

The annular flange $5_2$ is formed with circumferential spaced holes $5_4$ provided between the bolts $5_5$. These holes $5_4$ provide passages for an air flow during the rotation of the ribbed brake housing supplied from the outside of the vehicle. The air flow passes as indicated by arrow 24 through these holes $5_4$ along and near the cylindrical part of the hub 5, and in the radial direction along the surface of the brake housing member $5_1$, thus cooling the hub 5, the bearings 2, 3 and the brake housing member $5_1$. Openings $7_2$ and $7_3$ provided in the tapered section 7 and between the rim $7_1$ and the brake housing respectively provide passages for the air flow to escape.

Figure 5:
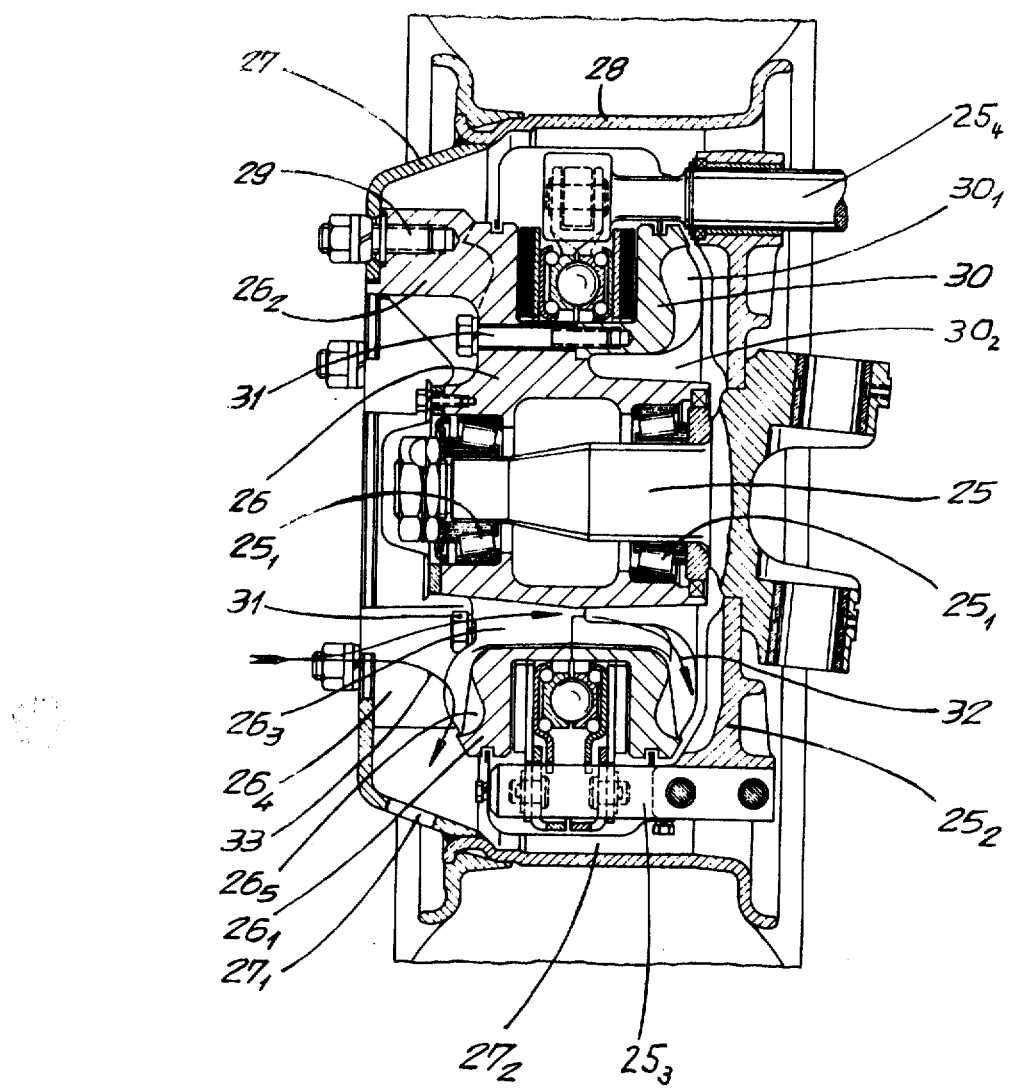
FIG. 5 is a vertical view through the front disc wheel of a truck.

FIG. 5 shows an embodiment of the invention applied to a front disc wheel of a truck. The brake housing incorporates two annular members $26_1$ and 30 bolted together by means of the bolts 31 at their radially inner circumference thereby forming an annular channel-like gap therebetween open on its radially outer side. The member $26_1$ is formed with the hub 26 being thus integral part thereof. The member 30 is the cover of the brake housing. The hub 26 is journalled by means of the tapered roller bearings $25_1$ on the steering knuckle 25. Fitted on the steering knuckle 25 is the carrier $25_2$. The carrier $25_2$ has the rotatably supported spindle $25_4$ and two brackets pivotally mounted, one of them is shown and indicated as $25_3$. The spindle $25_4$ and the brackets $25_3$ are provided to effect the braking mechanism and to abut the actuating means respectively. As these operations as well as the actuating means disposed in the annular gap are not objects of this invention, they are not described in detail. The hub 26 is formed with circumferentially spaced extensions $26_2$ adapted to mount a disc tapered section 27 thereto by means of the bolts 29 on which tapered section the rim 28 is mounted.

To promote the cooling of the brake from the outside of the vehicle, there are provided improved passages for this air flow supplied from the outside. An air flow arises through a ventilating effect during the rotation of the radial ribs $26_5$ and $30_1$ provided on the surfaces of the brake housing members $26_1$ and 30 respectively. Openings $26_4$ are provided between the extensions $26_2$ so that a first air flow passes, as indicated by arrow 33, through these openings $26_4$ in the radial direction along the housing member $26_1$. Openings $27_1$ and $27_2$ provided in the tapered section 27 and between the rim 28 and the brake housing respectively provide passages for the air flow 33 to escape. Formed within the hub 26 are circumferentially spaced channels $26_3$.

The channels $26_3$ run in the axial direction radially inwardly of the bottom of the annular gap and end in recesses $30_2$ provided between the hub 26 and the cover 30. These channels $26_3$ provide passages for an air flow indicated by arrow 32 to the surface of the cover 30, cooling the bearings $25_1$, the cylindrical part of the hub and the inner housing member 30. Advantageously the air flows 32 and 33 provide equal heat dissipation for both brake housing members $26_1$ and 30, so that a symmetrical thermal load of the linings in guaranted and a deformation of the brake housing in consequence of unequal cooling of its parts avoided.

FIGS. 6 and 7 show the invention applied to the dual spoke wheel of a heavy truck. With the exeption of the modified wheel bodies, this embodiment corresponds to the embodiment shown in FIGS. 1 to 4 so that the same reference characters are used for similar parts. The hub 34 is formed with a cast wheel spider $34_2$. The rims 35 and 36 are mounted on the spider $34_2$ by means of the rim clamps $35_1$. Circumferentially spaced holes $34_3$ formed in the spider $34_2$ provide passages for an air flow supplied from the vehicle's outside. The air flow passes, as shown by arrow 37, through the holes $34_3$ along and near the cylindrical part of the hub 34, radially along the housing member $34_1$ which is an integral part of the hub and escapes through openings (38) provided between the rim 36 and the brake housing.

FIG. 8 shows the invention applied to the brake in a front spoke wheel. The steering knuckle 42 has two extensions $42_1$, $42_2$ by which it is pivotally mounted on the axle 41. The steering knuckle 42 is provided further with the pin $42_3$ and the projecting parts $42_4$ and $42_5$. The hub 45 is journalled by means of the tapered roller bearings 43 and 44 on the pin $42_3$. The hub 45 is formed with a cast wheel spider $45_1$ on which the rim 48 is mounted by means of rim clamps 46 and bolts 47. The wheel spider $45_1$ is provided with stiffening ribs 45hd 45also providing an enlarged surface for cooling purposes. The brake housing incorporates two annular members $45_3$ and 58 bolted together at their radially inner circumference by means of the bolts 59 forming an annular channel-like gap therebetween open on its radially outer side. The member $45_3$ is formed with the hub 45 being thus an integral part thereof. The other annular member is the cover 58 formed with radial ribs $58_2$. Disposed within the annular gap are the brake shoes 50 and 51 and the actuating means 49. As these parts are not objects of this invention they are not described in all details.

The actuating means 49 and the brake shoes 50, 51 abut on two brackets extending over the annular gap. In FIG. 8 only one bracket 57 is shown.

Preferably the brackets 57 are pivotally mounted on the projecting parts $42_4$ and $42_5$ of the steering knuckle 42 advantageously without the provision of a carrier mounted on the steering knuckle. To effect the braking operation, i.e. to rotate the cam $55_1$, the compressed-air brake cylinder 52 is energized through the pipe 53. The cylinder 52 is attached to a stand 54 mounted on the steering knuckle 42 by means of the screws 56. The levers $52_1$ and $52_2$ operated by the cylinder provide the rotation of the spindle 55.

Formed within the hub 45 are circumferentially spaced channels $45_5$. The channels $45_5$ run through the hub radially inwardly of the bottom of the annular gap in the axial direction and join in openings $58_1$. The openings $58_1$ provide the continuation of the passages provided by the channels and are walled partly by the hub 45 partly by the cover 58. During rotation of the wheel a cooling air flow supplied from the vehicle's outside passes through the channels $45_5$ and openings $58_1$ as indicated by the arrows 61 to the surface of the cover 58 and along thereto in the radial direction.

Another air flow indicated by arrow 60 passes along the wheel spider $45_1$ and, respectively, along the brake housing member $45_3$ in the radial direction. Thus, equal cooling of both housing members $45_3$ and 58 and its bottom and of the bearings 43 and 44 is achieved guaranting symmetrical thermal loading of the linings and avoiding deformation of the brake housing in consequence of unequal cooling of its parts.

Figure 9:
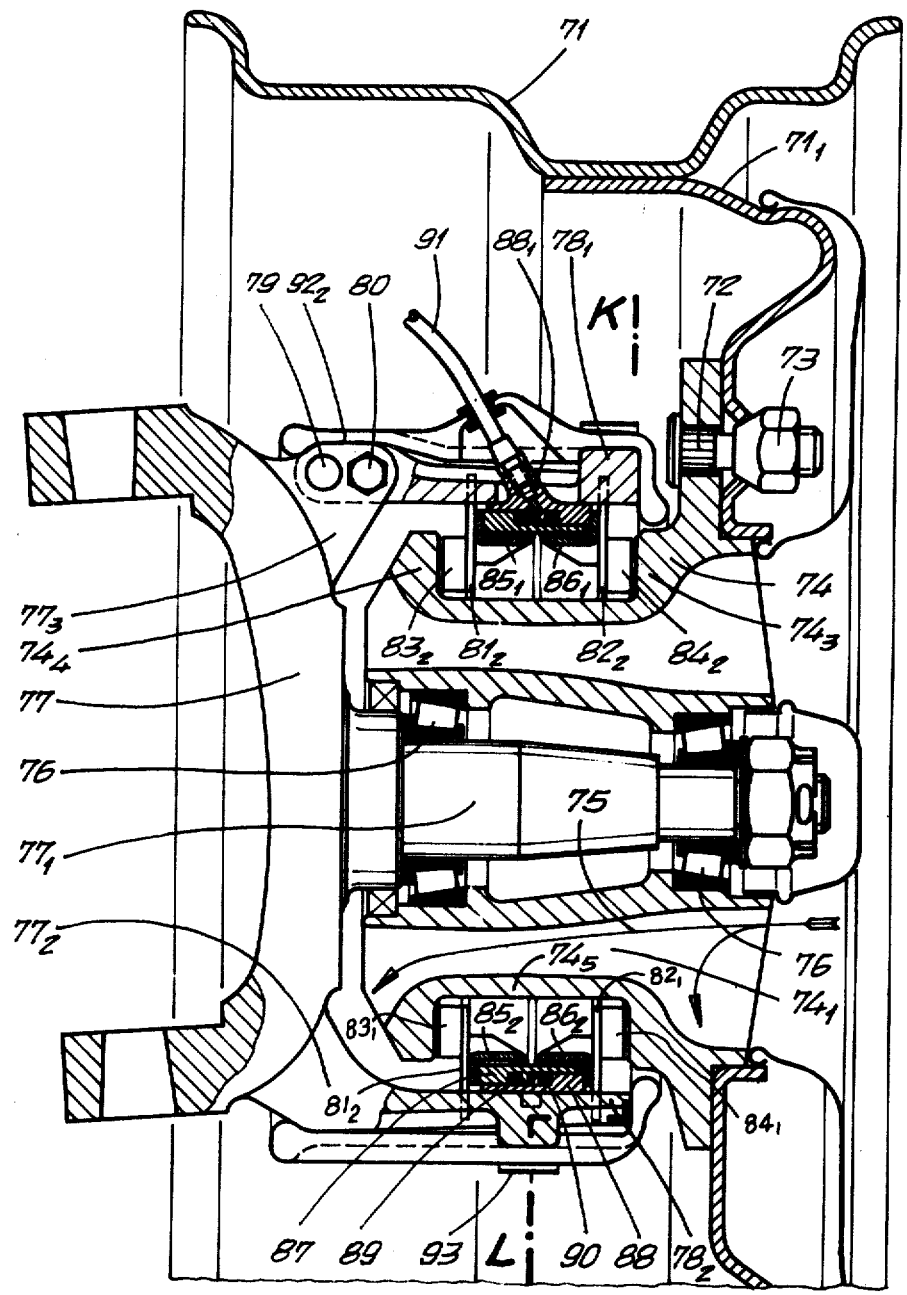
FIG. 9 is a vertical sectional view through the front disc wheel of a private vehicle.
Figure 10:
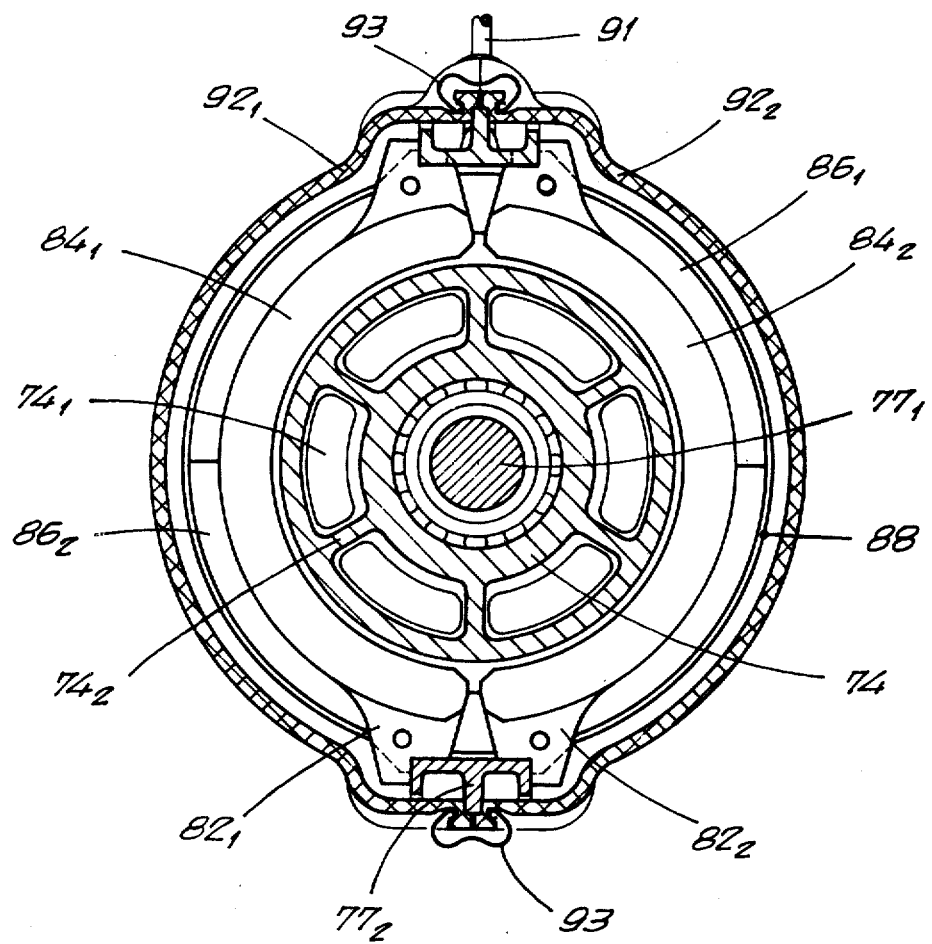
FIG. 10 is a cross-sectional view taken on the line K–L of FIG. 9.

FIGS. 9 and 10 show the invention applied to the brake in a front disc wheel suitable for use in private vehicles. The steering knuckle 77 is provided with a pin $77_1$ on which the hub 74 is journalled by the tapered roller bearings 76. The rim 71 is provided with the tapered section $71_1$ which is mounted, by means of the bolts 72 and the wheel nuts 73, on the hub 74. The brake housing is made of one piece which is an integral part of the hub 74, and has the two side members $74_3$ and $74_4$ and the bottom $74_5$. Over the annular gap provided between the side members $74_3$ and $74_4$ extend two brackets $78_1$ and $78_2$. The brackets $78_1$ is pivotally mounted on a projecting part $77_3$ of the steering knuckle 77 by means of the screws 79 and 80, the bracket $78_2$ forms one piece with the projecting part $77_2$ of the steering knuckle. The brackets provide abutments for the segmental brake shoes $81_1$, $81_2$, $82_1$, $82_2$ provided with the linings $83_1$, $83_2$, $84_1$, $84_2$, respectively, and for the hydraulic actuating means disposed between the brake shoes.

The brake shoe actuating means consist of two rings 87 and 88 respectively, each of L-section, the rings being assembled so that they partially overlap to provide between them an annular space into which hydraulic liquid is delivered through the pipe 91 and the opening $88_1$. Sealing rings 89 and 90 are provided to seal the annular space, and thrust members $85_1$, $85_2$, $86_1$, $86_2$ transfer the movement of the rings 87 and 88 to the brake shoes.

Formed within the hub 74 are circumferentially spaced channels $74_1$. The channels run radially inwardly of the bottom $74_5$ of the brake housing in the axial direction. Part of a cooling air flow caused by rotation of the wheel and supplied from the vehicle's outside as indicated by arrow 75 passes through these channels $74_1$ to the surface of the side member $74_4$, the other part of this air flow passes in the radial direction along the surface of the side member $74_3$, thus providing equal cooling of the entire brake housing as well as of the cylindrical part of the hub 74 and of the bearings 76.

Figure 11:
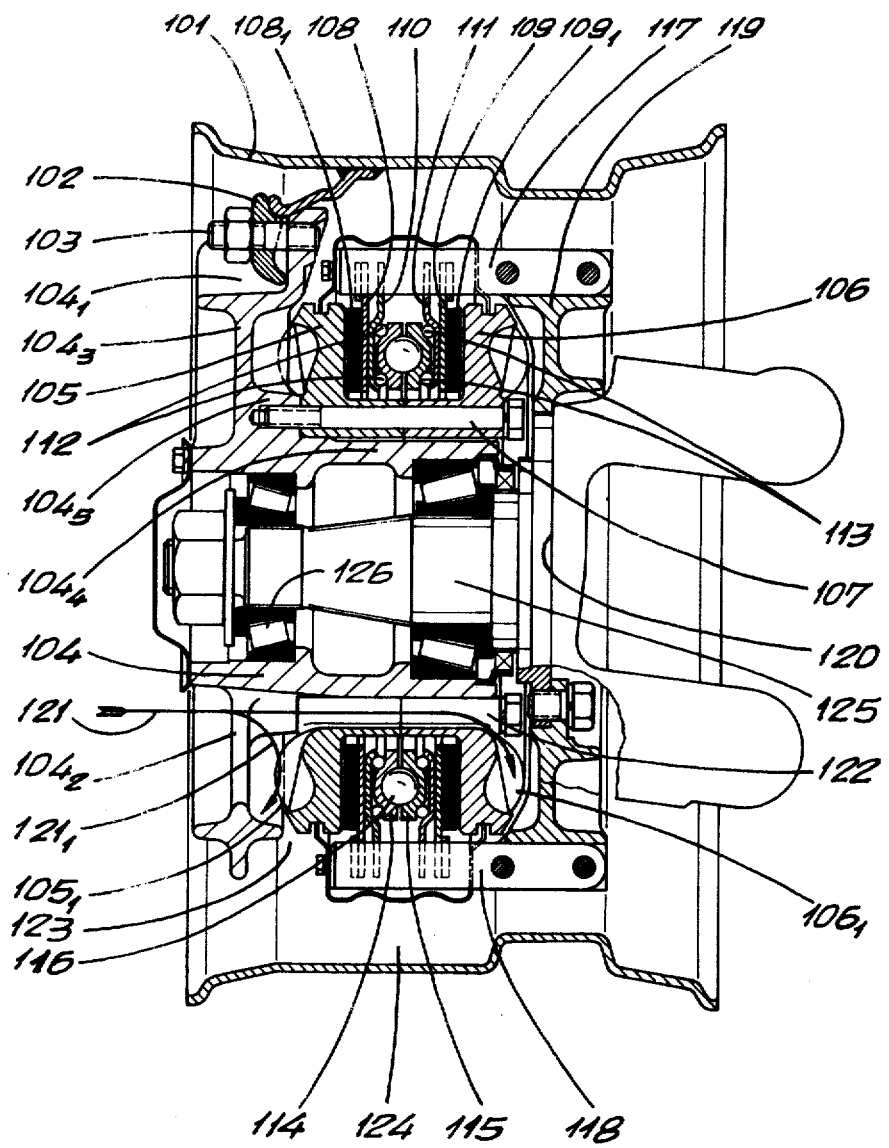
FIG. 11 is a vertical sectional view through the front spoke wheel of a truck.
Figure 12:
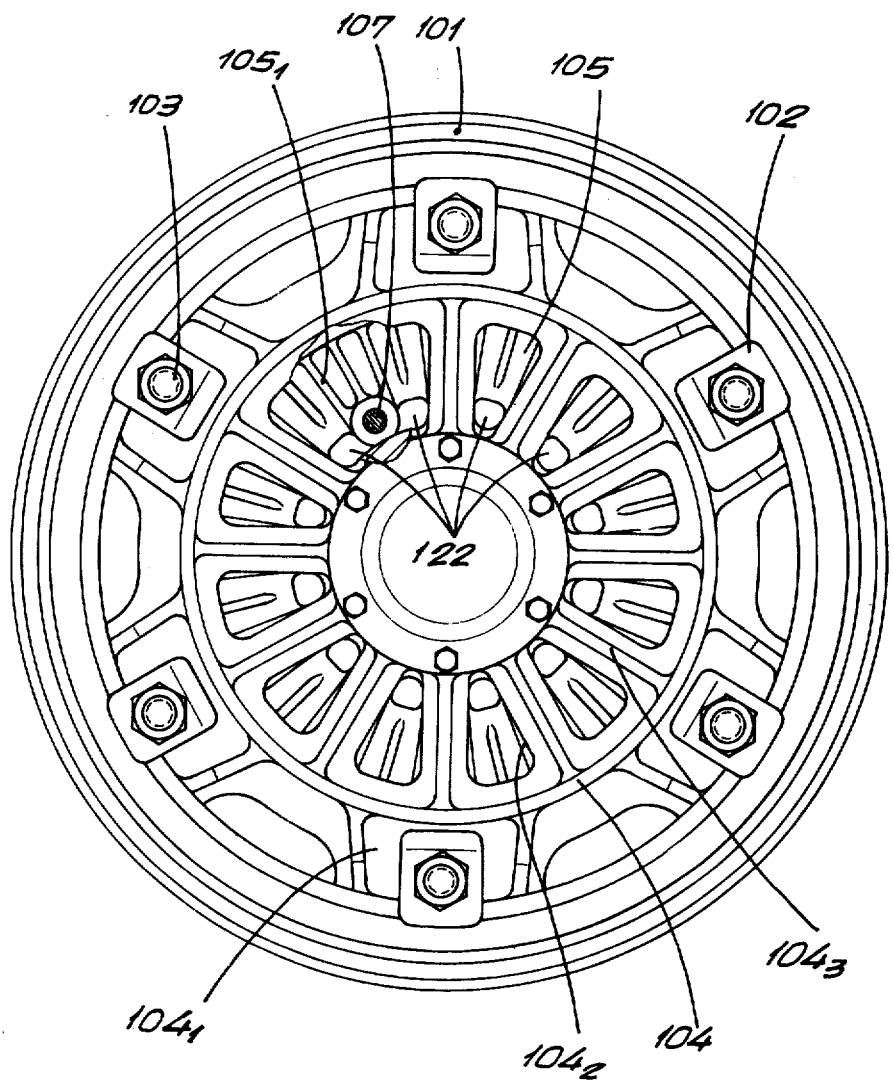
FIG. 12 is a view of the wheel in FIG. 11 from the outside in the axial direction.

FIGS. 11 and 12 show the invention applied to a brake of a front spoke wheel of a truck. Contrary to the embodiments shown in the FIGS. 1 to 10, no part of the brake housing in this embodiment is part of the hub. The cast wheel spider $104_1$ has the rim 101 mounted by means of the bolts 103 and the rim clamps 102. The wheel spider $104_1$ is an integral part of the hub 104. The hub 104 is journalled with its cylindrical part $104_4$ by means of the tapered roller bearings 126 on the pin 125 of the steering knuckle 120. The brake housing incorporates two identical annular members 105 and 106 bolted together at their inner circumference by means of the bolts 107. Disposed in the annular gap formed within the brake housing are the actuating means and, separated therefrom, the segmental brake shoes 108 and 109 with the linings $108_1$ and $109_1$, respectively. The actuating means comprise the two actuating rings 114 and 115, the balls 116 disposed in ramps between these actuating rings, ball bearings 112, 113 disposed on either side of the actuating rings and thrust rings 110, 111. The thrust rings 110, 111 and the brake shoes 108, 109 are formed with shoulders providing abutments on two brackets 117 and 118 extending over the annular gap. The brackets are pivotally mounted on a carrier 119 attached to the steering knuckle 120.

The surfaces of the brake housing members 105 and 106 are each formed with radial ribs $105_1$ and $106_1$, respectively. The wheel spider $104_1$ is provided with a plurality of circumferentially spaced openings $104_2$ of such a design that ribbed spokes $104_3$ remain between these openings. Provided along and radially inwardly of the bottom of the brake housing are circumferentially spaced channels 122. The channels run in the axial direction between the bolts 107 and are walled partly by the cylindrical part $104_4$ of the hub, partly by the housing members 105 and 106. Openings 123, 124 are provided between the wheel spider $104_1$ and the housing member 105 and between the rim 101 and the brake housing, respectively.

Caused by rotation of the wheel spider and the brake housing an air flow is supplied from the vehicle's outside through the openings $104_2$ as indicated by arrow 121. Part $121_1$ of this air flow passes in the radial direction along the surface of the housing member 105 and escapes through the openings 123 and 124. The remaining part of the air flow 121 passes through the channels 122 to the surface of the housing member 106 and along thereto in the radial direction. Thus the air flow provides the same heat dissipation from both housing members 105 and 106, and cools the cylindrical part $104_4$ of the hub and the bearings 126.

In comparison FIGS. 13 and 14 show a conventional drum brake provided in a front wheel of a truck and an improved disc brake according an embodiment of this invention for use in the same wheel. The reference numbers 200 indicate the points where the highest temperatures arise. At first sight the figures show that, for the drum brake, these points 200 are near the rim and the tire flanges 201, while for the disc brake the points 200 are advantageously remote from the tire flanges 201.

The figures further show for the drum brake that only a small space is provided for cooling air between the drum and the rim, while for the disc brake both ribbed housing members rotate within an air flow. As a result, the temperature at the points 200 in the drum brake is twice the temperature at the points 200 in the improved disc brake, for example temperatures of 600°C and 300°C respectively have been measured under the same loading conditions.

What I claim is:

1. A disc brake comprising: an axially elongated hub mounted on a non-rotational part for rotation relative thereto, a brake housing comprising an annular member having an inner portion and first and second radial portions extending radially outwardly from said inner portion and forming between them an annular gap of channel-like cross-section opened on its radially exterior side, at least part of the inner portion and one of said radial portions of the brake housing being cast integrally with said hub and with a set of spokes which extend radially outwardly from the hub, the opposite inner sides of said channel-like gap providing annular braking surfaces, at least one pair of brake shoes operatively connected to a non-rotating part and disposed in the channel-like gap, said brake shoes having friction faces facing the adjacent braking surfaces, actuating means for urging the brake shoes outwardly against their respective braking surfaces, radially extending ribs on the outer sides of the said first and second portions opposite from said braking surfaces defining between them outwardly opening channels, and including air flow channels extending axially completely through the said casting radially inwardly of said annular gap, said air flow channels connecting directly into the channels formed by said ribs to carry cooling air to the said inner portion of the brake housing and from there radially outwardly along the outer sides of the first and second portions through the rib formed channels, and including means for connecting the spokes to a wheel rim, and including openings through the spokes for the passage of air to the air flow channels.

2. A disc brake according to claim 1, wherein the one of the radial portions integrally cast with the hub has the other radial portion bolted thereto.

3. A disc brake according to claim 1, said actuating means comprising a pair of actuating rings, one adjacent each brake shoe, ball and ramp means for urging the actuating rings away from each other upon relative circumferential movement thereof, and said actuating means including means for engaging the actuating rings at the open radially exterior side of the annular gap to move the actuating rings relative to each other to urge the brake shoes against the braking surfaces.

4. A disc brake according to claim 1, said actuating means comprising a hydraulic means for hydraulically urging the brake shoes against the braking surfaces.

5. A disc brake according to claim 1, said brake housing comprising two separate annular members, one of said members being cast integrally with said hub and forming one of the radial portions, the other one of said members forming part of the inner portion and the other radial portion, and wheel rims attached to said spokes.

6. A disc brake according to claim 1, said brake housing comprising two annular members, the first of said members being cast integrally with said hub and forming one of the radial portions, the other one of said members forming part of the inner portion and the other radial portion and being attached at its radial inner circumference to said first member, said spokes adapted for mounting a disc section carrying a wheel rim, said air flow channels comprising circumferentially spaced channels provided within and running through said hub along the said inner portion, outer openings between the rim and said channel-like gap, thus establishing in combination a system of passages provided for a cooling air flow during rotation of the rim, said cooling air flow passing on the one hand through the openings between the spokes along the ribs of said first member and escaping through the said outer openings and on the other hand through said air flow channels and along the ribs of the other member, said cooling air flow dissipating equal amounts of heat from said two members, and cooling the hub and said inner portion of the housing.

7. A disc brake according to claim 1, said spokes comprising a wheel spider cast integrally with the hub and having a rim mounted thereto, said brake housing comprising two annular members, the first of said members being cast integrally with said spider and said hub and forming one of the radial portions, and the second of said members forming the other radial portion and part of the inner portion, said air flow channels comprising circumferentially spaced channels provided within and passing through said hub along the said inner portion, thus in combination establishing a system of passages provided for cooling air flow during rotation of the rim, said air flow passing on the one hand along the surface of said wheel spider and hence along the ribs of the first member, and on the other hand through said air flow channels and along the ribs of the second member, said air flow causing equal cooling of both said members, of the hub and of said inner portion.

8. A disc brake according to claim 7, including a steering knuckle provided with projecting parts attached thereto, and including pivotally mounted brackets extending over said annular gap.

9. A disc brake according to claim 1, said spokes carrying a rim, said air flow channels comprising circumferentially spaced channels provided within and running through said hub along the inner portion.

10. A disc brake according to claim 9, said spokes comprising a wheel spider cast integrally with the hub, a brake housing having outer and inner annular members forming respectively the two radial portions and also the inner portion, said members being secured together at their radial inner circumferences to form the inner portion and the bottom of the annular channel-like gap, said wheel spider having a rim attached thereto, said air flow channels comprising circumferentially spaced channels running in an axial direction and being partly bounded by said hub and partly bounded by said inner portion of said brake housing, openings between said wheel spider and the rim and further openings between said rim and said channel-like gap, thus establishing in combination a system of passages provided for a cooling air flow during rotation of the rim, said air flow passing on the one hand along the surface of the ribs of said outer member and escaping through said openings and on the other hand through said air flow channels along the surface of the inner member, said air flow dissipating equal amounts of heat from both of said members of the brake housing and cooling the said hub and the said inner portion of the housing.

11. A disc brake according to claim 1, said hub being mounted on the non-rotational part by means of journal bearings, and said air through the air flow channel cooling the journal bearings.

* * * * *